United States Patent

Murty

[11] 4,149,995
[45] Apr. 17, 1979

[54] GRANULAR ACTIVATED CARBON MANUFACTURE FROM BROWN COAL TREATED WITH CONCENTRATED INORGANIC ACID WITHOUT PITCH

[75] Inventor: Hari N. Murty, Grand Island, N.Y.

[73] Assignee: The Carborundum Company, Niagara Falls, N.Y.

[21] Appl. No.: 865,801

[22] Filed: Dec. 30, 1977

[51] Int. Cl.² ............... B01J 21/08; C01B 31/08; C01B 31/10; C01B 31/14
[52] U.S. Cl. ............... 252/444; 252/422; 252/423; 252/445; 423/449
[58] Field of Search ............... 252/421, 422, 423, 444, 252/445; 423/445, 449, 461

[56] References Cited

U.S. PATENT DOCUMENTS

| | | | |
|---|---|---|---|
| 3,630,959 | 12/1971 | Kiikka | 252/421 |
| 3,993,455 | 11/1976 | Reggel et al. | 423/461 |
| 3,998,604 | 12/1976 | Hinkley | 44/1 R |
| 4,014,817 | 3/1977 | Johnson et al. | 252/444 |
| 4,032,476 | 6/1977 | Murty | 252/444 |
| 4,039,473 | 8/1977 | Schafer | 252/425 |

*Primary Examiner*—Winston A. Douglas
*Assistant Examiner*—P. E. Konopka
*Attorney, Agent, or Firm*—David E. Dougherty; Robert C. Weber

[57] ABSTRACT

Granular activated carbon is manufactured from briquettes of about 1×2" mesh formed from brown coal from which iron material has been extracted and which has a moisture content of about 15% by weight, by crushing and screening the pre-treated coal briquettes to produce 8/30 mesh granules, which are treated by mixing with about 5% by weight of concentrated inorganic acid ($H_2SO_4$, $H_3PO_4$, or HCl), without the addition of a carbonaceous binder such as coal tar pitch. The so treated granules are ground to form fine powder of more than about 65% by weight $-325$ mesh powder, more preferably 75 to 85% by weight $-325$ mesh, which powder has a moisture (including acid) content of about 21% by weight, as a temporary binder, and which powder is compressed into shapes such as pellets of 0.5" diameter and 0.5" long under a pressure of 40,000 to 80,000 psi, and then granulated to obtain 6/20 mesh granules. These granules are devolatilized, without charring, by directly heating to and at a temperature higher than the charring temperature in an oxygen-free atmosphere, and then activated by heating to and at a temperature higher than the devolatilizing temperature in an atmosphere containing a gaseous activating agent. The overall yield of granular activated carbon is not less than about 22% by weight, dry basis, and the activated granules have a surface area of not less than about 900 $m^2$/gram, an iodine number of not less than about 900, an ash content of not more than about 6% by weight, an abrasion number of not less than about 70, an apparent density of not less than about 0.48 gram/cc, and a Molasses number of not less than about 200; which properties make them suitable for use in water and waste water treatment and in other applications.

24 Claims, 1 Drawing Figure

GRANULAR ACTIVATED CARBON MANUFACTURE FROM BROWN COAL TREATED WITH CONCENTRATED INORGANIC ACID WITHOUT PITCH

CROSS REFERENCE

This application is related to my copending applications Ser. No. 884,084, filed Mar. 6, 1978 Ser. No. 585,931, filed June 11, 1975, and now U.S. Pat. No. 4,032,476, issued June 28, 1977; Ser. No. 818,699, filed July 25, 1977, and Ser. No. 856,881, filed Dec. 2, 1977.

BACKGROUND OF THE INVENTION
1. Field Of The Invention

This invention relates to granular activated carbon manufacture, and more particularly to a new and improved process for making granular activated carbon from brown coal treated with concentrated inorganic acid, without the addition of a carbonaceous binder such as pitch, and to a new and improved granular activated carbon made by such process and having properties which make it suitable for use in water and waste water treatment and in other applications.

2. Glossary Of Terms

In order to facilitate a clear understanding of this invention, various terms of art employed herein are defined as follows:

Abrasion number — is a measure of the resistance of the activated carbon granules to degrading on being mechanically abraded. It is measured by contacting a sample with steel balls in a pan on a machine and shaking the contents for a given time and determining the resultant particle size distribution and hence the mean particle diameter. The abrasion number is the ratio of the final average (mean) particle diameter to the original average (mean) particle diameter (determined by screen analysis) times 100.

Activated carbon — is carbon which is "activated" by heating to high temperature preferably with steam or carbon dioxide as the gaseous activating agent in producing an internal porous particle structure.

Activating — means heating coal at high temperatures on the order of about 600 to about 1000° C. in the presence of a gaseous activating agent as is well known in the art.

Adsorption isotherm — is a measurement of the adsorptive capacity of an adsorbent (viz. granular activated carbon) as a function of the concentration, or pressure, of the adsorbate (viz. $N_2$) at a given temperature. It is defined as the constant temperature relationship between the amount adsorbed per unit weight of adsorbent and the equilibrium concentration, or partial pressure.

Apparent density — is the weight per unit volume of homogeneous granular activated carbon. To assure uniform packing of the granules during measurement, a vibrating trough is used to fill the measuring device.

Ash — is a principal mineral constituent of coal, carbon and pitch. It is normally defined as a weight percent basis after a given amount of sample is reduced to ash.

Average (mean) particle diameter — is a weighted average diameter of granular activated carbon sample. A screen analysis is run and the average particle diameter is calculated by multiplying the weight of each fraction by its average diameter, adding the products, and dividing by the total weight of the sample. The average diameter of each fraction is taken as the size midway between the sieve opening through which the fraction has passed and the sieve opening on which the fraction was retained.

Brown coal — is a low rank lignitic type coal which is ranked below sub-bituminous coal, together with and usually slightly below lignite. Typically, in the moist, as received, or as mined condition, it has a moisture content of more than 40% by weight and generally a moist BTU/lb. of less than 8300, and usually is *unconsolidated.* See ASTM standard D-388-66, wherein BTU wise, "brown coal", as used herein, would be included in the designation "Lignite A" or "Lignite B", but also see former ASTM standard D-388-58, wherein "brown coal", as used herein, is distinguished from and ranked below "lignite", as used herein, by reason of brown coal's usual unconsolidated characteristic.

Charring — means heating coal at low temperatures on the order of about 175° C. to about 275° C. in the presence of oxygen.

Coking value — is usually expressed as percent residual carbon obtained when a dry sample of coal, tar or pitch is vaporized or pyrolyzed for a specific time at a specific temperature that limits the available oxygen supply (ASTM Method D-2416). The coking value, expressed as percent residual carbon, indicates the coke forming properties of the material.

Devolatilizing — means heating coal at imtermediate temperatures on the order of about 400° C. to about 600° C. in an oxygen-free atmosphere.

Granular activated carbon — is "activated carbon" which has a particle size, i.e., "mesh", which is not less than about 40 and preferably not less than about 60.

Iodine number — is the milligrams of iodine adsorbed by 1 gram of granular activated carbon at an equilibrium filtrate concentration of 0.02 N iodine. It is measured by contacting a single sample of carbon with an iodine solution and extrapolating to 0.02 N by an assumed isotherm slope. This number can be correlated with the ability of granular activated carbon to adsorb low molecular weight substances.

Lignite — is a low rank lignitic type coal which is ranked below sub-bituminous coal, together with and usually slightly above brown coal. Typically, in the moist, as received, or as mined condition, it has a moisture content of more than 20% by weight and generally a moist BTU/lb. of less than 8300, and usually is *consolidated.* See ASTM standard D-388-66, wherein BTU wise "lignite", as used herein, would be included in the designation "Lignite A" or "Lignite B", but also see former ASTM standard D-388-58, wherein "lignite", as used herein, is distinguished from and ranked above "brown coal", as used herein, by reason of lignite's usual consolidated characteristics.

Mesh — (or mesh size) is the particle size of granules as determined by the U.S. Sieve Series or the Tyler Series. Usually, this term refers to the sizes of the two screens, in either of the above series, between which the bulk of a sample falls. For example, "8/30 mesh" (or "8 by 30 mesh" or "8 × 30 mesh") means that 90% by weight of the sample will pass through a No. 8 screen but will be retained on a No. 30 screen. Alternatively, this term refers to a maximum particle size, such as in defining the fineness of powder material. For example, "65% by weight −325 mesh powder" means that 65% by weight of a given sample passes through a No. 325 mesh screen.

Molasses number — is calculated from the ratio of the optical densities of the filtrate of a molasses solution treated with a standard activated carbon and the activated carbon in question.

Pitch — is a black or dark viscous substance obtained as a residue in the distillation or organic materials and especially tars.

Powder — means a particle size, i.e., "mesh", which is smaller than about 40 and preferably smaller than about 60. The larger the mesh number, the smaller the size.

Surface area — is the amount of surface area per unit weight of granular activated carbon; it is determined from the nitrogen adsorption isotherm by the Brunauer, Emmett and Teller (BET) method, and it is expressed in $m^2$/gram.

3. Prior Art

Granular activated carbon is particularly useful in water and waste water treatment not only because it is highly effective in purifying the intake, as well as the effluent from municipal and industrial systems, but also because it can be regenerated for repeated use. However, in order to accomplish these objectives it must possess certain properties, namely, a minimum surface area of about 900 $m^2$/gram for adequate adsorption capacity, a minimum iodine number of about 900 for adequate adsorption of low molecular weight substances, a minimum Molasses number of about 200 for adequate decolorizing, a maximum ash content (by weight) of not more than about 12%, and preferably not more than about 8%, for purity, a minimum abrasion number of about 70 and preferably not less than about 80, for adequate hardness in maintaining granular integrity in use and in regeneration, and a minimum apparent density of not less than about 0.46 gram/cc, preferably about 0.48 gram/cc, for obtaining the dense, closely packed beds and columns needed in waste water treatment.

These properties can be obtained by making granular activated carbon from bituminous coal and from sub-bituminous coal, such as disclosed in both of my aforesaid copending applications Ser. Nos. 884,084 and 818,699, and my aforesaid patent, as well as from brown coal, such as disclosed in my copending Serial No. 856,881, by dilute inorganic acid treatment of brown coal, which is considerably cheaper, as the starting material, than bituminous coal, and usually even cheaper than sub-bituminous coal. However, until the present invention, it is not known that anyone else has accomplished this by concentrated inorganic acid treatment of brown coal, without the addition of a carbonaceous binder.

In my aforesaid copending Serial No. 856,881, it was found that this objective could be accomplished by dilute inorganic acid treatment of brown coal, as noted above. However, this involved treating the coal granules with a dilute inorganic acid, washing off the acid and at least partially drying the granules. In one case, he granules were dried partially to a moisture content of about 10 to about 25% by weight without the addition of a carbonaceous binder such as pitch. In the other case, the granules were dried thoroughly and thereafter mixed with about 5 to about 15% by weight of such binder. In the present invention, the process is simplified by treating the coal granules with a small amount of concentrated inorganic acid, without the addition of a carbonaceous binder, while at the same time controlling the moisture (including acid) content of the powder formed from the treated granules, in order to permit proper compacting and further processing to produce hard granular activated carbon, wherein the moisture (including acid) content of the powder is used as a temporary binder, all as described in detail below.

Moreover, when so using bituminous coal, it has been found necessary not only to mix in pitch but also to char the granulated mixture prior to the devolatizing and activating steps. Otherwise, because of the high coking tendency of the preferred bituminous coals, the granules fuse together during devolatization and are thereby rendered unsuitable both for proper activation and for obtaining the aforesaid desired properties. Likewise, in working with various bituminous coals, it has been found that this charring step is necessary, whether or not the granules have been treated with either a concentrated inorganic acid or a dilute aqueous solution of inorganic acid prior to charring. While it has been found that such dilute inorganic acid treatment does have a substantial beneficial effect on at least the aforesaid properties of granular activated carbon produced from low rank bituminous coal, as disclosed in my aforesaid copending Ser. No. 818,699, and that such dilute and concentrated inorganic acid treatments do have a substantial beneficial effect on both the overall yield and properties of granular activated carbon produced from sub-bituminous coal, neither treatment has little, if any, beneficial effect upon either the overall yield of the resulting granular activated carbon or the aforesaid properties desired, when working with a highly coking, preferred bituminous coal.

Furthermore, it has been found herein that granular activated carbon of the aforementioned properties can not be produced from brown coal when such coal is not subjected to such concentrated acid treatment or charring, despite the fact that such coal usually is not coking at all. Although it has been found herein that brown coal can be charred without such concentrated acid treatment, to produce granular activated carbon, the yield is very low and the properties, at best, are below the minimum acceptable for granular activated carbon suitable for use in water and waste water treatment and in other applications. As a matter of fact, it has been found herein that the charring step, originally thought necessary for so processing brown coal, can be eliminated, and that if appropriate concentrated inorganic acid treatment is employed, this results in significant increases not only in yield, but also in the desired properties, without the need for a carbonaceous binder.

Moreover, and surprisingly enough, it has been found that such concentrated acid treatment does not produce an acceptable granular activated carbon from lignite, at least the particular variety treated.

There have been some attempts in the past, as set forth in U.S. Pat. No. 2,049,931, to produce activated carbon from brown coal or lignite by the addition thereto of a large amount of concentrated inorganic acid, but following the teachings of this patent does not allow one to make a hard granular activated carbon, rather only powdered activated carbon. A more recent attempt to make a commercially successful activated carbon from low grade coal, such as bituminous, sub-bituminous and lignitic coals by dilute acid treatment is disclosed in U.S. Pat. No. 4,014,817. However, the purpose of this treatment is to increase the sorbant properties of the product by the removal of magnesium and calcium salts, and the patented process still requires heat oxidation or charring of the coal following acid treatment. This heat oxidation adversely affects yield, and tests have shown that the granular product of the patent, while dense and sorptive, does not possess the hardness required for maintaining granular integrity in use and in regeneration. Thus, the patented product is not suitable for use in water and waste water treatment.

Other more recent attempts to produce activated carbon from Australian brown coal are indicated in U.S. Pat. Nos. 3,998,604 and 4,039,473.

In the former, the process actually disclosed merely provides an acid environment which consists in the separation of sand and clays present in the coal for demineralization purposes (i.e., ash removal) only. Although this patent briefly mentions further treatment for preparing activated carbon, it does not specify either how this is to be done or the quality and type of product ultimately to be produced.

In the latter, the process disclosed is directed to the production of activated carbon by first converting the coal into a potassium coal, carbonizing the same and then acid leaching to remove potassium, followed by activation. While the activated granular product is said to have high surface area, the hardness, density and integrity thereof are not even mentioned.

Hence, neither of these two patents suggests an operational process for successfully producing a hard and dense granular activated carbon suitable for use in water and waste water treatment.

SUMMARY OF THE INVENTION

Accordingly, a general primary objective of the present invention is (1) to provide a new and improved process for making hard granular activated carbon from lower cost brown coal instead of higher cost bituminous coal, and wherein there is eliminated not only the charring step necessary for processing bituminous coal, but also the problems created by using large amounts of acid in such brown coal processing, while the overall yield of granular activated carbon is increased significantly by appropriate treatment of brown coal with a small amount of concentrated inorganic acid, without the addition of a carbonaceous binder; (2) as well as to provide a new and improved hard granular activated carbon made by such process and having the aforementioned described properties of adsorption (as measured by surface area and iodine number), decolorization (as measured by Molasses number), purity (as measured by ash content), hardness (as measured by abrasion number) and density (as measured by apparent density), which make it suitable for use in water and waste water treatment and in other applications. To this end, the invention includes (1) a process for making hard granular activated carbon suitable for use in water and waste water treatment and in other applications comprising: forming granules from brown coal; treating the granules with a small amount of concentrated inorganic acid by mixing the granules with not less than about 1 and not more than about 10% by weight of the acid, without the addition of a carbonaceous binder such as pitch; reducing the treated granules to form fine powder having a moisture (including acid) content of not less than about 10 and not more than about 30% by weight; [or as alternately expressed: so treating the granules by mixing them with not less than about 1 and not more than about 10% by weight of the acid; reducing the treated granules to form fine powder having not less than about 10 and not more than about 30% by weight of temporary binder consisting essentially of water and such acid;] compressing the powder to form shapes; reducing the shapes to reform granules; devolatilizing the reformed granules, without charring, by directly heating to and at a temperature higher than the charring temperature in an oxygen-free atmosphere; and activating the devolatilized granules by heating to and at a temperature higher than the devolatilizing temperature in an atmosphere containing a gaseous activating agent; and (2) hard granular activated carbon made by such process. The shapes may be of various configurations larger than the granules such as pellets, briquettes, thin sheets of corrugated cross-section, etc.

A specific primary objective is to provide (1) such process wherein the coal has an ash content of not more than about 5% by weight, dry basis, and preferably below about 5% by weight, dry basis; prior to forming the granules, the coal is pre-treated by extracting iron material, preferably from coarse particles formed by reducing the coal, followed by further reducing the extracted coarse particles to form fine particles which are dried partially to a moisture content of about 10 to about 25% by weight, followed by compressing the partially dried fine particles under a pressure of not less than about 5,000 psi, preferabout about 5000 to about 10,000 psi, to form briquettes, from which the granules are formed; prior to treating the granules at least one of the coal and granules has a moisture content of not more than about 30% by weight, preferably about 25%, and not less than 5% by weight, preferably about 10%; the acid is selected from the group consisting of $H_2SO_4$, $H_3PO_4$, HCl and mixtures thereof, preferably $H_3PO_4$, and the overall yield of granular activated carbon is not less than about 22% by weight, dry basis, preferably about 25%; the granules are treated by mixing with about 5% by weight of concentrated acid; at least one of the treated granules and powder has a moisture content of not less than about 10% by weight, preferably about 15% and not more than about 30% by weight, preferably about 25%; the powder is more than about 65% by weight −325 mesh, preferably about 75% to about 85% by weight −325 mesh; the powder is compressed to form shapes under a pressure of not less than about 40,000 psi; during devolatilization the heating rate is about 50° C. to about 300° C. per hour, the temperature is about 400° C. to about 600° C., and the time is about one-half hour to about 3 hours; and during activation the heating rate is about 100° C. to about 1000° C. per hour, the temperature is about 600° C. to about 1000° C., and the time is about 1 hour to about 6 hours; and (2) hard granular activated carbon made by such process and having an abrasion number of not less than about 70, preferably about 80.

Additional objectives and advantages of the invention will becomes apparent upon consideration of the following detailed description and accompanying drawing wherein:

DESCRIPTION OF THE PREFERRED EMBODIMENTS

In this detailed description, reference will be made to nine Examples, of which Examples 1 and 5–7 relate to and provide background for the present invention, while Examples 2–4, 8 and 9 are illustrative of the invention per se. Moreover, the order or sequence of the Examples has been selected in order to show a progression in experimentation from Example 1, which represents an attempt to apply a known charring technique for making granular activated carbon from bituminous coal to brown coal; through the inventive acid treatment techniques of Examples 2–4; to Examples 5 and 6 which compare the results obtained by attempting to superimpose an inventive acid treatment technique (Example 6) on a known charring technique (Example 5) for making granular activated carbon from bituminous coal; to Example 7, which shows that an inventive acid treatment technique does not work as well for lignite, and finally to inventive Examples 8 and 9 which show the importance of moisture control (Example 8) and fineness of grinding in powderizing (Example 9).

EXAMPLE 1

CHARRING OF BROWN COAL IN MAKING GRANULAR ACTIVATED CARBON

In making granular activated carbon from bituminous coal it has been found necessary to char the coal granules prior to activation, as will be seen below in Examples 5 and 6. Thus, this technique was adopted in order to see what sort of product could be so obtained from brown coal. The starting material for these and each of the ensuing Examples 2–4, 8 and 9 was a batch of Australian brown coal having the following analyses, by weight, in the moist, as received, or as mined condition, and in the dry condition, respectively:

| Proximate Analysis | | | Ultimate Analysis | |
|---|---|---|---|---|
| | Moist | Dry | | Dry |
| % Moisture | 66.0 | — | % Carbon | 67.4 |
| % Volatile Material | 17.5 | 51.4 | % Hydrogen | 4.7 |
| | | | % Nitrogen | 0.5 |
| % Ash | 0.7 | 2.1 | | |
| | | | % Sulfur | 0.3 |
| % Fixed Carbon | 15.8 | 46.5 | | |
| | | | % Oxygen | 27.1 |
| BTU/lb. | — | 3,000 | | |

These analyses, except perhaps for ash content, are, in general, typical of brown coal.

Figure 1:
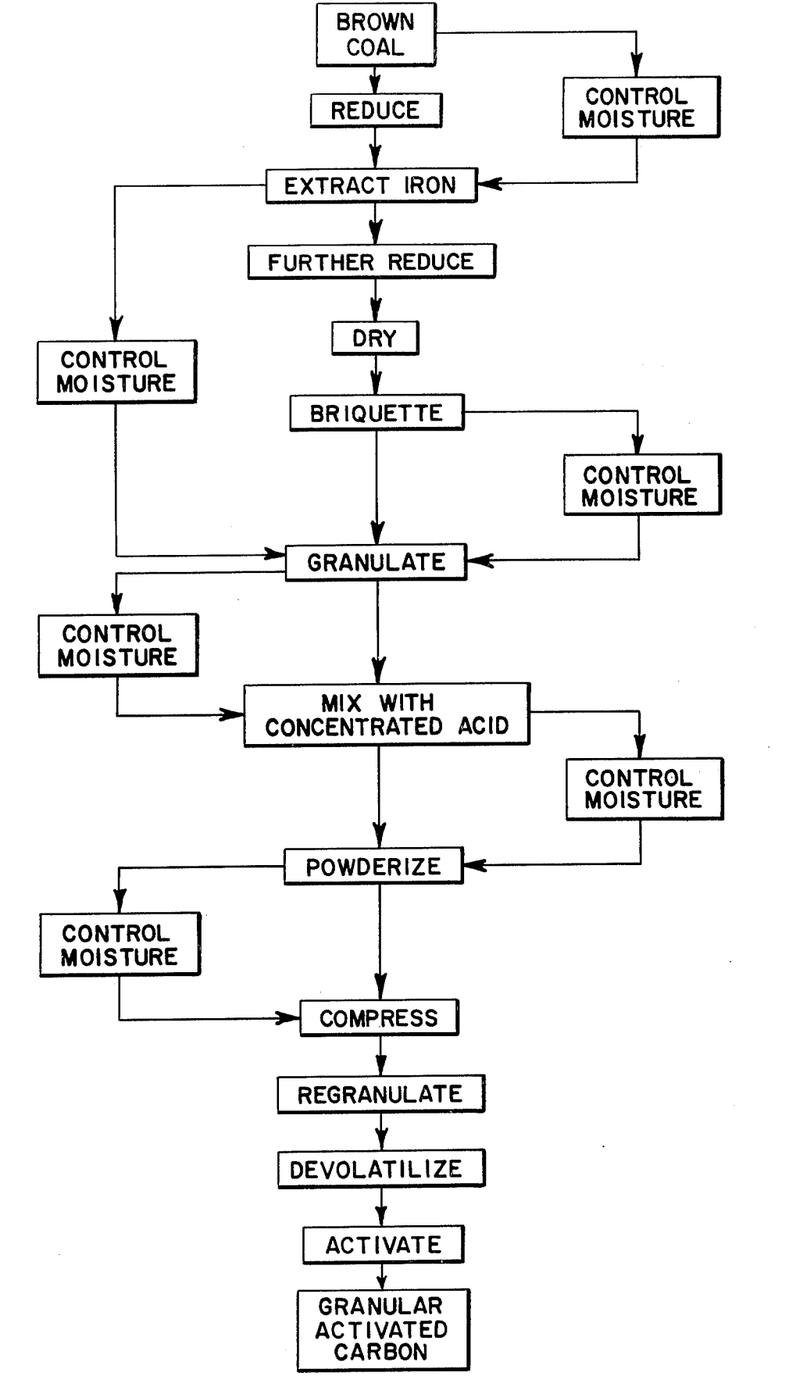
The single FIGURE is a block diagram or flow sheet illustrating schematically the various steps of the process, as well as resulting product, both embodying the invention.

Prior to acid treatment, and as shown in the drawing, the brown coal, in the moist, as received, or as mined condition, was subject to a coarse reduction by crushing and screening to roughly 4 mesh size, after which it was passed under an electromagnet to extract iron material. The so extracted coarse particles were further reduced in a hammer mill to produce fine particles of about 20 mesh, and then steam dried to a controlled moisture content of about 15% by weight, although a range of about 10 to about 25% is quite feasible. Next, the partially dried fine particles were compacted to a pressure of about 5,000 to about 10,000 psi to form briquettes of about 1 × 2 inches, these briquettes being more economical for transportation from the mining site to the acid treatment site. Thus, such briquettes formed the starting material in the present work.

At the same time, it should be understood that while the above constitutes the preferred procedure, the essential step is the iron material extraction, whether or not briquettes are formed, in order to remove as much as possible the forms of iron, iron oxides and other iron compounds which are not readily soluble in the treating acid, and would otherwise remain as ash in the granular activated carbon, thereby detracting from its purity.

As far as moisture control is concerned, it is important, and in the as mined condition, a moisture content of 66% by weight makes the coal somewhat more difficult to work with. Thus, it is preferred that the extracted fine particles be steam dried partially as noted above, to a moisture content of 10 to 25%, preferably 15% by weight, in order to form compact briquettes. At the same time, while convenient and preferred, briquetting is not an absolute necessity. Hence, as shown at the upper right and left in the drawing, the moisture could be so controlled if desired, either before or after the extraction, such as if the coal were to be granulated without briquetting. However, as will be seen below, such moisture control at either of the above stages is not an absolute necessity.

Returning to the preferred procedure, the pre-treated brown coal briquettes were crushed to a very fine size such that more than 65% by weight of the material passed through 325 mesh screen, preferably about 75 to 85% −325 mesh. The powder was pressed at 40,000 to 80,000 psi pressure into cylindrical pellets approximately ½" high and ½" diameter. The apparent density of these pellets was in the range of 1.1 to 1.2 grams/cc. The pellets then were granulated to obtain granules of 6 by 20 mesh with an apparent density on the range of 0.64 to 0.68 gram/cc.

In the course of experimentation, and as also will be seen from Examples 2–4 and particularly 8, it was found herein that to obtain from the pellets hard compact reformed granules (suitable for further processing in obtaining hard granular activated carbon) without the use of a carbonaceous binder such as coal tar pitch, the moisture content of the brown coal and/or briquettes, and of the treated granules and powder (including acid) is important. Too low a moisture content, by weight, i.e., below about 5% for the coal and/or briquettes or 10% for the treated granules and powder, or too high a moisture content, by weight, i.e., above about 30% for the coal and/or briquettes, treated granules and powder, led to poor compaction of the pellets, and hence granules that were not hard and dense.

Thus, as shown at the right of the drawing, should the briquettes pick up too much moisture, such as the result of a rainstorm, for example, they can be dried to the proper moisture content before granulating, e.g., to minimize gumming of the mill. If, on the other hand, such briquettes become too dry, they can be moisturized to minimize dusting on granulating. Alternatively, the granules can be dried or wet to the proper moisture content before powderizing. Still another approach would be to control the moisture of the powder to within the above noted range, because hard compact pellets can not be formed, either with too much or too little moisture, inasmuch as they will disintegrate upon regranulating to form mostly powder, with the few granules resulting being neither hard enough nor compact enough for further processing into granular activated carbon. However, in this Example, the 15% by weight moisture content of the pre-treated brown coal briquettes was well within the prescribed limits, and hence no drying or moisturizing was necessary in the first instance.

600 grams of the reformed granules obtained according to the procedure described above were loaded into a cylindrical container prepared from 50 mesh screen. The container was mounted onto a cylindrical shaft and the assembly was loaded into a cylindrical furnace so that the container and the granules therein were rotated slowly and uniformly (1 to 2 rpm) inside the furnace.

The granules then were subjected to a charring treatment wherein the granules were heated in an atmosphere of air and nitrogen (deficient oxygen) to 200° C. at the rate of 100° C./hour, and maintained at this temperature for 1 hour. During the process, the granules were slowly and uniformly rotated (1 to 8 rpm) so that they were exposed to the oxidizing action of $O_2$ present. During the course of experimentation, it was found that higher temperatures and/or higher oxygen content in the atmosphere led to poor process control and eventually a poor product. The loss of weight in the charring step was in the range of 5 to 15% by weight based on the dry coal.

The granular material then was subjected to a devolatilization process. The granules were loaded into the furnace described above and heated to 450° C. at the rate of 300° C./hour in an atmosphere free from oxygen (in the present case an atmosphere composed of $N_2$ and the volatiles given off by the granules), and maintained at the devolatilizing temperature for 1 hour and then cooled. During the course of experimentation it was learned that the charring and devolatilization steps could be carried out sequentially without cooling down, provided the atmosphere was altered such that it was nearly free of oxygen during heat up beyond 200° C. It also was learned that the presence of oxygen at these higher temperatures led to higher losses, poorer yield of product and in general, an inferior granular product.

The yield of granules after devolatilization was about 60% by weight based on charred granules, and their apparent density was about 0.6 gram/cc.

Next, the devolatilized granules were loaded into a cylindrical furnace and were subjected to activation by heating the granules to 800 to 900° C. in an atmosphere composed of a carrier gas of $N_2$ and steam and by maintaining the granules at the activating temperature for 4 to 5 hours. The amount of steam fed in was pre-determined such that it amounted to 1 to 3 grams of steam/gram of charge/hour.

The yield of granular activated carbon from this step was in the range of 30 to 40% by weight based on devolatilized material. The granular product has a surface area of 600 to 900 $m^2$/gram, an ash content in the range of 6 to 8% by weight, an abrasion number of about 55 to 60 and an apparent density in the range of 0.40 to 0.44 gram/cc.

The overall yield based on dry coal was 15 to 20% by weight and the granules had adsorption properties, ash, density and hardness which were below those required for granular activated carbon for use in water and waste water treatment and in other applications. During the course of experimentation, it was learned that if the brown coal was processed as above, but without the charring step, the resultant product was soft and had less activity, thus indicating the importance of charring the brown coal (when processed by itself), even though such a coal is not coking at all.

The following Examples 2-4 represent preferred embodiments of the present invention, which is represented schematically in the drawing. Thus, from a method standpoint, a preferred embodiment of the inventive process generally includes the steps of granulating the pre-treated brown coal briquettes which have, in the as received condition, the proper moisture content range of about 5 to about 30% by weight, preferably about 10 to about 25% by weight, and more preferably 15%, or are dried, or moisturized, as shown at the middle right of the drawing, to so control such moisture content prior to granulating; followed by the steps of treating the granules by mixing them with a small amount of concentrated inorganic acid, while maintaining their moisture content at an amount of not less than and preferably more than about 10 but not more than about 30% by weight, without the addition of a carbonaceous binder such as pitch; powderizing; compressing; regranulating, devolatilizing, without charring; and activating; all in order to produce the desired inventive product of hard granular activated carbon which is acceptable for use in water and waste water treatment and in other applications.

The inventive process also contemplates the following variations. The brown coal, following iron material extraction can be directly granulated, with or without moisture control, before and/or after the iron extraction step, as shown at the upper right and left of the drawing, and with or without the other various moisture control operations, as shown in the drawing, and as referred to in detail in Example 8.

Examples 2 and 4 represent two preferred embodiments of such treatment wherein the granules are treated with concentrated $H_2SO_4$ and HCl respectively, while Example 3 represents a most preferred embodiment of such treatment wherein the granules are treated with concentrated $H_3PO_4$.

EXAMPLE 2

CONCENTRATED $H_2SO_4$ TREATED BROWN COAL GRANULES (WITHOUT PITCH) IN MAKING GRANULAR ACTIVATED CARBON

A batch of Australian brown coal briquettes, as described in Example 1, was crushed and screened to obtain 8 × 30 mesh granules. 900 grams of the granules were mixed with about 5% by weight of concentrated $H_2SO_4$ in the ratio of 95 grams of coal and 5 grams of acid of 95% concentration by weight.

During the course of experimentation, it was learned that size of granules, thoroughness of mixing, concentration of acid, and the ratio of acid to coal all have important effects on further processibility of the coal to form suitable granular activated carbon. Therefore, the specific numbers cited in this and the ensuing inventive Examples are merely illustrative and not restrictive. For example, both coarser and finer granules can be employed during the mixing with corresponding results, the amount of acid added to coal should not be less than about 1% and not more than about 10%, preferably about 5% (i.e., percent amount of acid used, by weight).

The treated granules containing about 19% (actually 19.25%) by weight of moisture (including acid) were milled into a very fine powder such that more than 65% by weight of the material passed through 325 mesh screen, preferably 75 to 85% −325 mesh, as explained in Example 9 below. In view of the fact that the moisture content of the pre-treated coal briquettes (about 15% by weight) and of the treated granules (about 19%, including acid) was well within the prescribed limits, no drying of the briquettes or of the treated granules was required.

The powder was pressed into cylindrical pellets of ½ inch diameter and ½ inch high using a pressure of 40,000 to 80,000 psi, the apparent density of the pellets being in the range 1.1 to 1.2 gram/cc, and these pellets were regranulated to obtain 6 × 20 mesh granules having an apparent density of 0.65 to 0.68 gram/cc. 600 grams of the reformed granules were loaded into a cylindrical furnace and devolatilized as described in Example 1, but without the charring step, which devolatilization consisted of heating the granules to 450° C. at 300° C./hour in an atmosphere free of oxygen and holding at temperature for 1 hour. This devolatilization step can be varied such as by using a heating rate of about 50° C. to about 300° C. per hour to a final temperature of about 400° C. to about 600° C., with the time at temperature ranging from about ½ hour to about 3 hours, in an inert atmosphere.

During the course of experimentation it was learned that the charring step described in Example 1 is not necessary to make hard and highly adsorptive granular activated carbon. Two batches of identical material, treated by mixing with acid as described above, were processed, one with a charring step and the other without. While the yields in specific process steps varied, the overall yield and activity of the granular activated carbon product were the same, indicating that the charring step can be eliminated for this material. This presumably was a result of the coal being subjected to the action of the acid before and during devolatilization.

The devolatilized granules, which had an apparent density of 0.62 to 0.64 gram/cc and a yield of 50% by weight based on the dry coal, were loaded into a cylindrical furnace and subjected to activation by heating the granules to 800 to 900° C. in an atmosphere composed of $N_2$ and steam, and by maintaining the granules at this temperature for 4 to 5 hours. The amount of steam fed into the furnace was precalibrated such that it amounted to 1 to 3 grams of steam/gram of charge/hour.

The resulting overall yield of granular activated carbon, based on the dry coal, was in the range of 22 to 26% by weight versus 15 to 20% for Example 1. The granules had a surface area of 900 to 1050 m²/gram, as compared to 600 to 900 for Example 1, an iodine number of 900 to 1000, an ash content of 4 to 6% by weight, as compared to 6 to 8% for Example 1, an abrasion number of 70 as compared to 55 to 60 for Example 1, and an apparent density of 0.48 to 0.50 gram/cc, as compared to 0.40 to 0.44 for Example 1.

Thus, these granules were hard, very adsorptive, and comparable to other grades of carbon preferred for use in water and waste water treatment and in other applications, particularly in view of the increases in yield, hardness and density which are attributed to the treatment with acid in lieu of the charring step. Further, it is to be noted that not only can an acceptable granular activated carbon product be made from brown coal without the use of any carbonaceous binder such as coal tar pitch, and without charring, but also that treatment by mixing with a small amount of concentrated inorganic acid significantly increases yield and adsorption, all as compared to Example 1. It also is noteworthy that a hard granular activated carbon (with abrasion number of 70 to 80) was prepared from brown coal treated with a small amount of concentrated inorganic acid for the first time without the use of a carbonaceous binder such as pitch.

EXAMPLE 3

CONCENTRATED $H_3PO_4$ TREATED BROWN COAL GRANULES (WITHOUT PITCH) IN MAKING GRANULAR ACTIVATED CARBON

A batch of Australian brown coal briquettes, as described in Example 1, was crushed and screened to obtain 8 × 30 mesh granules, 900 grams of which were mixed with about 5% by weight of concentrated $H_3PO_4$ in the ratio of 95 grams of coal and 5 grams of commercially available acid of 75% by weight concentration. The treated granules containing about 19% by weight of moisture (including acid), which was well within the about limits, were milled into a very fine powder such that more than 65% by weight of the material passed through 325 mesh screen (65% by weight −325 mesh), preferably 75 to 85% −325 mesh.

The powder was pressed into cylindrical pellets of ½ inch diameter and ½ inch long using a pressure of 40,000 to 80,000 psi, and the apparent density of the pellets was in the range 1.1 to 1.2 grams/cc.

The 6 × 20 mesh reformed granules from the pellet reduction were loaded into a cylindrical furnace and devolatilized as described in Example 1, but with no charring being necessary prior to such devolatilization. The devolatilized granules, which had an apparent density of 0.58 to 0.60 gram/cc, and a yield of 55% to 65% by weight, based on the dry coal, were activated in the manner also set forth in Example 1.

The overall yield of granular activated carbon, based on the dry coal, was in the range of 25 to 30% by weight, versus 15 to 20% for Example 1 and 22 to 26% for Example 2. The granules had a surface area of 900 to 1050 m²/gram, versus 600 to 900 for Example 1, an Iodine number of 900 to 1100, a Molasses number of 230, an ash content of 4 to 6% by weight, as compared to 6 to 8% for Example 1, an abrasion number of 70 to 80, as compared to 55 to 60 for Example 1 and 70 for Example 2, and an apparent density of 0.48 to 0.50 gram/cc as compared to 0.40 to 0.44 for Example 1.

Thus, the resulting granules were hard, very adsorptive, and were comparable to other grades of granular activated carbon preferred for use in waste water treatment and other applications. It is to be noted once again that an acceptable product can be made from brown coal without a carbonaceous binder and without charring, and that mixing with a small amount of concentrated acid significantly increases yield and adsorption, as compared to Example 1. As for using $H_2SO_4$ or $H_3PO_4$ as the acid, $H_3PO_4$ clearly is more effective in producing a granular activated carbon product with higher yield (25 to 30% for $H_3PO_4$ versus 22 to 26% for $H_2SO_4$).

EXAMPLE 4

CONCENTRATED HCl TREATED SUB-BITUMINOUS COAL GRANULES (WITHOUT PITCH) IN MAKING GRANULAR ACTIVATED CARBON

The same procedure was followed as for Example 3, except that concentrated HCl of 95% by weight concentration was substituted for the concentrated $H_3PO_4$. The bulk density of the pellets was in the range of 1.1 to 1.2 grams/cc; the reformed granules had an apparent density of 0.62 to 0.68 gram/cc, and the devolatilized granules had an apparent density of 0.60 to 0.65 gram/cc, and a yield of 22 to 26% by weight based on the dry coal.

The overall yield of granular activated carbon, based on the dry coal, was in the range of 22 to 26% by weight, versus 15 to 20% for Example 1 and 25 to 30% for Example 3. The granules had a surface area of 1000 to 1050 m²/gram, versus 600 to 900 for Example 1, an iodine number of 900 to 1000, an ash content of 4 to 6% by weight, versus 6 to 8% for Example 1, an abrasion number of 70, versus 55 to 60 for Example 1 and 70 to 80 for Example 3, and an apparent density of 0.48 to 0.50 gram/cc, versus 0.40 to 0.44 for Example 1.

Thus, the resulting granules were hard, very adsorptive, and comparable to other grades of granular activated carbon preferred for use in water and waste water treatment and in other applications, particularly in view of the increases in yield, hardness and density over Example 1, which are attributed to the treatment with acid in lieu of the charring step. As compared to Example 2 ($H_2SO_4$), the yield and properties were in the same general range. As compared to Example 3 ($H_3PO_4$), the yield and hardness were somewhat lower, but the remaining properties were in the same general range.

The next two Examples represent an endeavor to see what happens when bituminous coal is treated conventionally and then in accordance with the inventive process, first without concentrated acid treatment prior to the addition of pitch, (Example 5) and second with concentrated acid treatment (Example 6), without the addition of pitch.

EXAMPLE 5

USE OF BITUMINOUS COAL AND PITCH TO MAKE GRANULAR ACTIVATED CARBON

The starting material was a batch of eastern bituminous coal having the following analyses by weight:

| Proximate Analysis | | | Ultimate Analysis | | |
|---|---|---|---|---|---|
| | As Received | Dry | | As Received | Dry |
| % Moisture | 2.04 | — | % Moisture | 2.04 | — |
| % Ash | 1.20 | 1.26 | % Carbon | 82.30 | 84.00 |
| % Volatile Material | 33.10 | 33.80 | % H | 5.20 | 5.29 |
| % Fixed Carbon | 63.60 | 64.90 | % $N_2$ | 1.30 | 1.33 |
| | | | % S | 0.34 | 0.35 |
| BTU/lb. | 14,571 | 14,874 | % Ash | 1.23 | 1.26 |

These analyses are, in general, typical of eastern bituminous coals. These coals also are highly coking and low in ash content. The dried coal was crushed to obtain 8 × 30 mesh granules, 900 grams batches of which were mixed with No. 125 coal tar pitch of the following characteristics:

| Softening Point | 129.2° C |
|---|---|
| Benzene Insolubles | 33.2% by weight |
| Quinoline Insolubles | 13.1% by weight |
| Coking Value (Conradson) | 61.1% by weight |
| Ash | 0.17% by weight | in the ratio of 90 grams of coal granules and 10 grams of pitch (10 parts per hundred by weight).

The mixtures was milled into a very fine powder so that 65% of the powder passed through 325 mesh screen. The milled powder was compressed into pellets ½ inch diameter and ½ inch high using a pressure of 40,000 to 80,000 psi. The pellets had a bulk density of 1.18 grams/cc and were granulated to obtain 6 × 20 mesh granules having an apparent density of 0.65 gram/cc.

600 grams of the granules were loaded into a cylindrical furnace and were subjected to the charring process substantially as described in Example 1. However, in this case, the charring consisted of heating the granules from room temperature to 250° C. at 100° C./hour and maintaining at temperature for 2 hours. An atmosphere of 0.5 standard cubic feet per hour at 1 atmosphere and room temperature (SCFH) of $N_2$ and 0.5 SCFH of air was fed into the furnace while the cylindrical container was rotating at 1 to 4 rpm.

In the course of experimentation it was found that heating rate, temperature (particularly the amount of oxygen present), temperature and time at temperature were critical variables that had an important influence on how the granules were suited for further processing in making hard granular activated carbon. For example, too small a time (less than ½ hour) at temperature or too low a temperature (lower than 200° C.), in general, led to difficulties in further processing of the granules. Thus, without proper charring, during the devolatilization step, the granules fused together and were unsuitable for proper activation and for obtaining the desired properties of the granular activated carbon.

When properly charred, as described above, the yield of the granules was 69% by weight, based on the dry coal pitch mixture and they had an apparent density of 0.62 gram/cc.

The charred granules then were devolatilized and activated in the same manner as described in Example 1.

At the end of the process, hard granular activated carbon was obtained, with an overall yield of 34.0% by weight based on the dry coal pitch mixture. The granules had an apparent density of 0.50 gram/cc, an iodine number of 1080, a surface area of 1040, an ash content of 2.2% by weight, and an abrasion number of 80.

Thus, the resulting granules were hard, very adsorptive, low in ash, and in all respects very much comparable to the grades of carbon preferred for use in water and waste water treatment and in other applications. However, it is particularly noteworthy that hard granular activated carbon could not be made from this bituminous coal without subjecting the granules to the charring step described above, prior to devolatilization and activation. During the course of experimentation, granules were devolatilized without the charring step and a fused mass (instead of granules) unsuitable for activation was obtained, thus indicating the necessity and importance of the charring step.

EXAMPLE 6

CONCENTRATED $H_3PO_4$ TREATED BITUMINOUS COAL (WITHOUT PITCH) IN MAKING GRANULAR ACTIVATED CARBON

The same procedure, as set forth in Example 5 was followed through the initial granulating step. At this point, 900 grams of the dry coal granules were mixed with about 5% by weight of 75% by weight concentrated $H_3PO_4$, in the ratio of 95 grams of coal and 5 grams of acid. The mixture was milled into 65% by weight −325 mesh powder, and was pressed into pellets of ½" diameter and ½" high using a pressure of 40,000 to 80,000 psi. The bulk density of the pellets was in the range of 1.1 to 1.2 grams/cc, and they were regranulated to obtain 6 × 20 mesh granules having an apparent density at this stage of 0.64 gram/cc.

The reformed granules were loaded into a cylindrical furnace and were subjected to the charring step described in Example 5, producing a 65% by weight yield and an apparent density of 0.62 gram/cc. In the course of experimentation, it was learned that even for concentrated acid treated bituminous coal under the conditions employed, the charring step was necessary as a pretreating step, in order to obtain proper granular activated carbon. A batch of such concentrated acid treated bituminous coal was devolatilized without the charring step, whereupon a fused mass of coke was obtained, which was unsuitable for further processing into granular activated carbon. This was very much unlike the experience with concentrated acid treated sub-bituminous coal, wherein the charring step could be omitted without adverse consequences, and was both an unexpected and unique result.

The charred granules then were devolatilized and activated in the manner described in Example 1. At the end of the activation step, hard granular activated carbon was obtained, with an overall yield of 33% by weight based on the dry coal. The granules had an apparent density of 0.48 gram/cc, a surface area of 1000 $m^2$/gram, an iodine number of 1050, an ash content of 7% by weight, and an abrasion number of 70 to 80.

Thus, the granules were hard, very adsorptive, low in ash and in all respects very much comparable to the grades of carbon preferred for use in water and waste water treatment and in other applications. At the same time, it is particularly noteworthy that hard granular activated carbon could not be made from this bituminous coal without subjecting the granules to the charring step described above, even though the coal had been acid mixed. In this regard, the result is very much unlike that for brown coal, wherein concentrated acid treating enables one to eliminate the charring step, while still producing an acceptable product.

Another important and notable feature was that the concentrated acid treatment of bituminous coal with concentrated $H_3PO_4$ did not appear to significantly alter the yield (from 34 to 33%). In contrast, this result was very much unlike that for the brown coal of Example 3 wherein concentrated $H_3PO_4$ acid treating of the coal led to substantially improved yield from the 15 to 20% for Example 1 to the 25 to 30% of Example 5, which approaches the 34 to 33% yields of these last two Examples. These two results were indeed unique and unexpected in dealing with brown coal.

The next Example represents an attempt to apply the concentrated acid treatment technique of the invention to lignite which ranks lower than sub-bituminous coal, but is ranked together with and usually slightly above brown coal.

EXAMPLE 7

CONCENTRATED $H_3PO_4$ TREATED LIGNITE COAL (WITHOUT PITCH) IN MAKING GRANULAR ACTIVATED CARBON

The starting material in this Example was a batch of lignite coal having the following analyses by weight:

| Proximate Analysis | | | Ultimate Analysis | | |
| --- | --- | --- | --- | --- | --- |
| | As Received | Dry | | As Received | Dry |
| % Moisture | 30.30 | — | % Moisture | 30.30 | — |
| % Ash | 9.92 | 14.23 | % Carbon | 41.50 | 59.5 |
| % Volatile | | | % H | 3.15 | 4.5 |
| Material | 50.0 | 71.71 | | | |
| | | | % $N_2$ | 3.50 | 5.0 |
| % Fixed Carbon | 9.80 | 14.05 | % S | 0.73 | 1.4 |
| | | | % Ash | 9.92 | 14.23 |

These analyses are, in general, typical of lignite coals, and these coals, in general, have a high ash content compared to other coals. The as received coal was dried partially to a moisture content of about 15% by weight and then crushed to 8 × 30 mesh granules, which were mixed in the ratio of 95 grams of granules to 5 grams of concentrated $H_3PO_4$ (75% by weight concentration). This mixture was thoroughly milled such that more than 65% by weight of the powder material passed through 325 mesh screen, preferably 75 to 85% -325 mesh. The powder was pressed into cylindrical pellets of ½" diameter and ½" high, using a pressure of 40,000 to 80,000 psi, the apparent density of the pellets being in the range of 1.1 to 1.2 grams/cc. The pellets were granulated to obtain 6 × 20 mesh granules having an apparent density of 0.58 to 0.62 gram/cc. The granules were devolatilized and activated as described in Examples 2 to 4.

The resulting granules had very low apparent density, of 0.25 to 0.30 gram/cc, a surface area of 1000, an iodine number of 1050 and an ash content of 16% by weight. The granules showed no cohesion and very low abrasion. Repeated experiments to optimize the properties, while showing some improvements, did not produce the preferred required density of 0.48 gram/cc or higher, and abrasion number of 70 or higher. Thus, an acceptable granular activated carbon which is hard and suitable for a variety of applications in liquid phase, such as water and waste water treatment, could not be produced under the aforementioned conditions from lignite coal.

Thus, it is patently obvious from this and the foregoing Examples that:

A. Treating a bituminous coal with concentrated acid did not materially affect the processability of the coal into hard granular carbon or the present yield of the said carbon from coal, and the concentrated acid treatment step did not eliminate the necessity of a charring step.

B. Treating a lignite coal with concentrated acid did not result in an acceptable granular activated carbon where the carbon from lignite was too light and too soft.

C. In contrast, and surprisingly so, it clearly has been demonstrated in the preferred inventive embodiments that hard granular activated carbon suitable for use in water and waste water treatment and in other applications can be produced from brown coal, *provided* the said coal is subjected to appropriate treatment with concentrated acid (because very hard granular activated carbon can not be produced from the untreated brown coal), and that such treatment does result in an unexpected and hence an inventive result of high percent yield of granular activated carbon from brown coal, where the yield approaches that from bituminous coal, particularly comparing Example 3 with Examples 5 and 6.

D. Another indeed unexpected result of the appropriate treatment of brown coal with concentrated acid is that the charring step found necessary for treated and untreated bituminous coal and for untreated sub-bituminous or brown coal can be eliminated in making hard, dense, adsorptive granular activated carbon from so treated brown coal.

E. An additional, and most surprising unexpected result of the inventive concentrated acid treatment of brown coal is the fact that it works in a manner comparable to that for sub-bituminous coal, as described in my aforesaid U.S. Pat. No. 4,032,476, but not for the lignite coal of this Example. Logically, one skilled in the art would expect a downward, step by step applicability of such concentrated acid treatment from sub-bituminous coal; but this has not proven to be the case from experimentation to date. Thus, the nature of the starting coal is an important, and apparently critical factor in determining the applicability or non-applicability of a particular mode of treatment such as that of the present invention, and the results of such treatment are not predictable on a logical basis.

The next Example is similar to Example 3, but emphasizes the importance of controlling the moisture content of the coal and/or granules formed therefrom, and/or the treated granules and/or the powder formed from the treated granules.

EXAMPLE 8

CONCENTRATED $H_3PO_4$ TREATED BROWN COAL (WITHOUT PITCH) IN MAKING GRANULAR ACTIVATED CARBON: IMPORTANCE OF CONTROLLING MOISTURE CONTENT

Since the moisture content (including acid) of the powder formed from the treated granules is used as a temporary binder in forming the pellets, the following experiments were conducted as variations in the procedure of Example 3, in order to help define the operative and preferred ranges of the moisture content of the coal and powder.

A batch of the Australian brown coal briquettes of Example 1 was dried thoroughly, then crushed and screened to obtain 8/30 mesh granules which were mixed with 75% by weight concentrated $H_3PO_4$ in the ratio of 95 grams of coal and 5 grams of acid. The mixture was milled to obtain very fine powder such that more than 65% by weight, preferably 75 to 85%, passed through a 325 mesh screen. Then the powder was pressed into pellets, as in Example 3. However, in this instance, when the coal was dried thoroughly prior to processing [the moisture content, including acid, of the treated granules being under 10% by weight, i.e., about 6% (actually 5.95) or 7% (actually 6.90)], the powder could not be compacted into pellets suitable for the desired further processing. The pellets readily disintegrated into powder, even when care was used in re-granulating, and the few granules obtained had little cohesion and could not be processed further.

Another batch of the said Australian brown coal briquettes of Example 1 was crushed and screened to obtain 8 × 30 mesh granules, and sufficient water was added such that the moisture content was in the range of 30 to 35% by weight. To this was added the 75% by weight concentrated $H_3PO_4$ in the ratio of 95 grams of coal and 5 grams of acid. The mixture was milled into powder and pelletized, as in Example 3, to produce pellets having an apparent density of 1.2 grams/cc. However, on regranulation to obtain 6/20 mesh granules, the pellets disintegrated into powder with few granules. Even those granules obtained had little cohesion and could not be processed further.

Thus, it has been demonstrated from this and the foregoing inventive Examples that the moisture content, if any, by weight, of the coal and/or briquettes should be not more than about 30%, preferably not less than about 5%, and most preferably about 10 to about 25%. Inasmuch as the powder from the treated granules could not be processed successfully below or above the moisture levels of about 10 and about 30% by weight (including acid content), these are the operative limits of such powder, with more than about 10% but not less than about 30% by weight, say about 15 to about 25% by weight, being the preferred limits. These moisture contents limits, of course, take into account the operative limits of the concentrated acid, namely not less than about 1 and not more than about 10% by weight, preferably about 5%, at a concentration of at least about 50% by weight, preferably at least about 75% by weight.

The most preferred procedure for controlling moisture content is to start with a coal and/or briquettes having a moisture content, by weight, within the desired range, namely not more than about 30% preferably not less than about 5%, and most preferably about 10 to about 25%, such as the 15% content of the pre-treated Australian brown coal briquettes used herein. However, if the coal, as received, and/or in briquette form is too wet or too dry, then its moisture content can be controlled by drying or wetting respectively, as shown at the upper right, upper left and middle right of the drawing.

Continuing with the most preferred procedure, the amount by weight, of concentrated acid added, within the aforesaid operative limits of not less than about 1 and not more than about 10%, and preferably about 5%, should be such as to control the granular moisture (including acid) content, by weight, within the aforesaid operative limits of not less than about 10 nor more than about 30%, preferably about 15 to about 25%, such as the about 19% content obtained when about 5% acid is added to such 15% moisture containing Australian brown coal briquettes used herein. Of course, the moisture content of the powder will be the same or substantially the same as that of the granules when following such most preferred procedure, which eliminates any wetting or drying steps, as well as facilitating material handling while optimizing concentrated acid treatment.

However, if desired, the moisture content can be controlled in the same manner as for the coal, following granulating and before acid treatment, as shown at the middle left of the drawing. However, for ease of granulating in the first instance, so controlling the moisture content of the coal and/or briquettes is preferred, because this minimizes dusting when too dry and gumming when too wet.

Alternatively, the moisture (including acid) content of the granules, following acid treatment and prior to powderizing, can be controlled by appropriate wetting or drying to an amount within the aforesaid limits, as shown at the lower right of the drawing. While such moisture control at this stage of the process is not preferred, it is feasible where the moisture content is too low for proper pelletizing, because it does minimize dusting during powderizing, albeit dusting is a problem during initial granulating. Where the moisture content is too high, the acid tends to become more diluted during mixing, requiring more acid for proper mixing treatment than where the moisture content is normal, gumming does become a problem during initial granulating, and material handling is more difficult.

As a further alternative, the moisture content (including acid) of the powder can be controlled just prior to compressing, as shown at the lower left of the drawing. While such moisture control at this stage of the process also is not preferred, it is feasible where the moisture content is too low for proper pelletizing, albeit dusting is a problem during initial granulating and powderizing. Where the moisture content is too high, control at this stage has the same disadvantages as moisture control between acid mixing and powderizing, with the additional problem of gumming during powderizing.

Nevertheless, this invention does contemplate moisture control at any one or more of the aforesaid stages, in order that the moisture (including acid) content of the powder be within at least the aforesaid operative limits, by weight, of not less than about 10 nor more than about 30% preferably about 15 to about 25%, for proper compressing and further processing.

The next Example is similar to Example 3, but emphasizes the importance of fineness of grind in powderizing the treated granules before compressing.

EXAMPLE 9

FINENESS OF POWDER IN CONCENTRATED $H_3PO_4$ TREATED BROWN COAL (WITHOUT PITCH) IN MAKING GRANULAR ACTIVATED CARBON

The same procedure, as set forth in Example 3, was followed through the acid treatment step. Then the mixture was divided into two equal parts.

The first part was milled to a fine powder which was about 60 to about 65% by weight 325 mesh. The powder was compacted into pellets of approximately ⅜" high and ½" diameter under a pressure of 40,000 to 80,000 psi, and the apparent density of the pellets was in the range of 1.0 to 1.1 gram/cc. The pellets were granulated to 6 by 20 mesh and the density of the granules were 0.62 to 0.64 gram/cc. The granules were devolatilized as in Example 3 and the density of granules was 0.56 to 0.60 gram/cc. These granules were activated as described earlier in Example 3, and these activated granules had a density of 0.46 to 0.48 gram/cc, an iodine number of 900 to 1000, a surface area of 1050 m²/gram, an ash content of 5 to 6% by weight, and an abrasion number of 60 to 70. Thus, these granules are considerably softer and hence are not too suitable for use in water and waste water treatment and in other applications, because of possible excessive loss of material in use and regeneration when the granules are not very hard.

The second part was milled to a very fine powder such that it had a particle size of 75 to 85% by weight −325 mesh. The powder was compacted, as above, to pellet density of 1.1 to 1.2 grams/cc; the pellets were granulated and had a density of 0.64 to 0.68 gram/cc. The granules were devolatilized and activated, as above, and the apparent density of the activated granules was 0.48 to 0.52 gram/cc. The granules had an iodine number of 900 to 1000, surface area of 1000 to 1050 m²/gram, ash content of 5 to 6%, by weight and an abrasion number of 80.

Since the granules were subjected otherwise to identical processing conditions in part 1 and part 2, it is believed that the finer grinding of the treated sub-bituminous coal granules (75 to 85% −325 mesh) resulted in compact granules and hence a hard granular product. In contrast, as described in Examples 5 and 6, grinding the bituminous coal to 65% −325 mesh resulted in a hard granular product.

Thus, the fineness of the grind prior to compaction, required for brown coal, as compared to bituminous coal, is an unexpected requirement which could not have been deduced from prior art, and hence forms a preferred embodiment of the present invention.

It now is seen how the invention accomplishes its various objectives. Likewise, it is to be understood that while the invention has been described and illustrated herein by reference to certain preferred embodiments, the same are to be considered as illustrative, rather than as limiting.

What is claimed is:

1. A process for making hard granular activated carbon having an abrasion number of not less than about 70, an ash content of not more than about 8% by weight and being suitable for use in water and waste water treatment and in other applications comprising:

forming granules from brown coal from which iron material is magnetically extracted;

treating the granules with a small amount of concentrated inorganic acid by mixing the granules with not less than about 1 and not more than about 10% by weight of the acid for a time and at a temperature, acid concentration and acid to coal ratio sufficient to eliminate subsequent charring, without the addition of a carbonaceous binder;

reducing the treated granules to form fine powder having a moisture, including acid, content of not less than about 10 and not more than about 30% by weight;

compressing the powder to form shapes;

reducing the shapes to reform granules;

devolatilizing the reformed granules, without charring, by directly heating to and at a temperature higher than the charring temperature in an oxygen-free atmosphere; and activating the devolatilized granules by heating to and at a temperature higher than the devolatilizing temperature in an atmosphere containing a gaseous activating agent.

2. Hard granular activated carbon made by the process of claim 1.

3. The process of claim 1 wherein the extracted coal has an ash content of not more than about 5% by weight, dry basis.

4. The process of claim 1 wherein the extracted coal has an ash content below 5% by weight, dry basis.

5. The process of claim 1 wherein, prior to forming the granules, from the coal, the coal is pre-treated by magnetically extracting iron material therefrom.

6. The process of claim 1 wherein, prior to forming the granules from the coal, the coal is pre-treated by reducing the coal to form coarse granules from which iron material is magnetically extracted, followed by further reducing the extracted coarse particles to form fine particles which are dried partially to a moisture content of about 10 to about 25% by weight, followed by compressing the partially dried fine particles under a pressure of not less than about 5,000 psi to form briquettes, from which the granules are formed.

7. The process of claim 1 wherein at least one of the extracted coal and granules has a moisture content of not more than about 30% by weight prior to treating the granules.

8. The process of claim 1 wherein at least one of the extracted coal and granules has a moisture content of not less than about 5% by weight prior to treating the granules.

9. The process of claim 1 wherein at least one of the extracted coal and granules has a moisture content of not less than about 5 and not more than about 30% by weight prior to treating the granules.

10. The process of claim 1 wherein at least one of the extracted coal and granules has a moisture content of about 10 to about 25% by weight prior to treating the granules.

11. The process of claim 1 wherein the acid is selected from the group consisting of $H_2SO_4$, $H_3PO_4$, HCl and mixtures thereof, and the overall yield of granular activated carbon is not less than about 22% by weight, dry basis.

12. The process of claim 1 wherein the acid is $H_3PO_4$ and the overall yield is not less than about 25% by weight, dry basis.

13. The process of claim 1 wherein the granules are treated by mixing with about 5% by weight of concentrated acid.

14. The process of claim 1 wherein at least one of the treated granules and powder has a moisture content, including acid, of not less than about 10 and not more than about 30% by weight.

15. The process of claim 1 wherein at least one of the treated granules and powder has a moisture content, including acid, of about 15 to about 25% by weight.

16. The process of claim 1 wherein the powder is more than about 65% by weight $-325$ mesh.

17. The process of claim 1 wherein the powder is about 75% to about 85% by weight $-325$ mesh.

18. The process of claim 1 wherein the powder is compressed to form shapes under a pressure of not less than about 40,000 psi.

19. The process of claim 1 wherein during devolatilization the heating rate is about 50° C. to about 300° C. per hour, the temperature is about 400° C. to about 600° C. and the time is about one-half hour to about 3 hours.

20. The process of claim 1 wherein during activation the heating rate is about 100° C. to about 1000° C. per hour, the temperature is about 600° C. to about 1000° C., and the time is about 1 hour to about 6 hours.

21. The process of claim 1 wherein the powder is more than about 65% $-325$ mesh, and is compressed to form shapes under a pressure of not less than about 40,000 psi; in order to produce hard granular activated carbon having an abrasion number of at least 70.

22. Hard granular activated carbon made by the process of claim 21 and having an ash content of not more than about 6% by weight.

23. The process of claim 1 wherein the acid is $H_3PO_4$, the powder is more than about 65% $-325$ mesh, and is compressed to form shapes under a pressure of not less than about 40,000 psi; in order to produce hard granular activated carbon having an abrasion number of not less than about 80.

24. Hard granular activated carbon made by the process of claim 23 and having an ash content of not more than about 6% by weight.

* * * * *